(12) United States Patent
Soderstrom et al.

(10) Patent No.: US 6,741,982 B2
(45) Date of Patent: May 25, 2004

(54) SYSTEM AND METHOD FOR RETRIEVING DATA FROM A DATABASE SYSTEM

(75) Inventors: Rick Soderstrom, Ottawa (VA);
Michael Yarashevich, Ottawa (CA)

(73) Assignee: Cognos Incorporated, Ottawa (CA)

( * ) Notice: Subject to any disclaimer, the term of this patent is extended or adjusted under 35 U.S.C. 154(b) by 161 days.

(21) Appl. No.: 10/026,356

(22) Filed: Dec. 19, 2001

(65) Prior Publication Data

US 2003/0115190 A1 Jun. 19, 2003

(51) Int. Cl.[7] .................................................. G06F 17/30

(52) U.S. Cl. .................................................. 707/3; 707/5

(58) Field of Search .................................... 707/3, 5

(56) References Cited

U.S. PATENT DOCUMENTS

| | | |
|---|---|---|
| 6,076,092 A | 6/2000 | Goldberg et al. |
| 2003/0115190 A1 * | 6/2003 | Soderstrom et al. ........... 707/3 |

FOREIGN PATENT DOCUMENTS

| | | |
|---|---|---|
| EP | 0 550 368 A2 | 7/1993 |
| WO | WO 00/75849 A2 | 12/2000 |

OTHER PUBLICATIONS

Papakonstantinou, Y. et al., "A Query Translation Scheme for Rapid Implementation of Wrappers", pp. 1–26, XP002115326, Computer Science Department, Stanford University. Dec. 1995.

* cited by examiner

*Primary Examiner*—Charles Rones
(74) *Attorney, Agent, or Firm*—Shumaker & Sieffert, PA

(57) ABSTRACT

A fast and efficient system and method for retrieving data from a database system by a process external to the database system is provided, in which the database system accepts and processes data requests in a second query language in response to data queries issued in a first query language by the external process. The system comprises an interface module operatively coupled to the external process and the database system. Upon receiving a data query in the first query language from the external process, the interface module generates an equivalent data request in the second query language and sends the data request to the database system for processing and data retrieval. The interface module then transfers the retrieved data from the database system to the module and returns the 4data to the external process. The interface module operates as a plurality of independent co-operating processes handling at least in part concurrently various steps of the data query processing. In particular, data retrieval and transfer is carried out concurrently in the system by two separate processes.

26 Claims, 2 Drawing Sheets

SYSTEM AND METHOD FOR RETRIEVING DATA FROM A DATABASE SYSTEM

FIELD OF THE INVENTION

The present invention relates to data retrieval from a database system by an external process. More particularly, the invention relates to a method and system for retrieving data from a database system where the data retrieval from the database and data transfer to the external process are carried out concurrently by two separate cooperating processes.

BACKGROUND OF THE INVENTION

The field of business applications of computer technology has seen many important changes over the last few years. With steadily growing computational power and data storage capacities of computer systems used for business data processing, the interest of the business community has shifted from relatively simple data capture and management systems towards more sophisticated business management systems. Early data management systems, as represented by databases of operational data managed by associated database management systems (DBMS), were mostly designed to support the day-to-day operation and business functions of small to medium businesses or low organizational levels of big enterprises. These early data management systems have evolved into enterprise resource planning (ERP) systems, combining databases across the whole enterprise and integrating at the enterprise level all facets and functions of the business, including planning, manufacturing, sales and marketing. Modern ERPs not only support decision making at the enterprise level, but also allow data sharing across organizational units, which greatly improves the information flow through the company.

Various software systems and packages supporting the ERP approach to business data management have been developed over the years. An example of such a software package is SAP R/3 System available from SAP AG (Germany) or its U.S. branch, SAP America, Inc. SAP (from Systems, Applications, and Products in Data Processing) is a modularized, table-driven system capable of working in both transaction and batch modes to perform specified functions, such as order processing, inventory control, financial accounting and planning, production planning and control, etc. SAP is designed to interface with terminals, printers, databases, or external communications facilities, such as IBM's Virtual Telecommunications Access Method (VTAM).

Other systems and applications for business data management and analysis have also been developed over the last few years, such as the Business Intelligence suite of applications from Cognos Inc. (Canada). These applications provide various data analysis and visualization tools, including reporting tools, database navigation and exploration tools, data modeling tools, and data warehouse construction tools. They combine new ways of data analysis and presentation with methods for discovering hidden patterns and previously unrecognized relationships among the data, known as data mining.

Independently of the approach taken, all business data management and analysis tools rely for their operation on vast amounts of data stored in various databases. The organization of these databases usually depends on the system under which the databases have been created and are being maintained. Even though the relational model is almost universally followed for the data storage, some systems, in particular the SAP system, add an abstraction layer on top of the relational database, which layer provides additional meaning to the data and ensures data integrity and security, and insulating the user from the actual data container. Bypassing such a layer to access directly the data can normally be achieved, if at all, only under the threat of compromising the security and integrity of data and is almost never attempted.

Access to data stored in a database is normally achieved by using data querying facilities provided by the DBMS associated with the database, usually in the form of a query language processor. By sending a suitable data request or a series of such requests formulated in the query language supported by the DBMS, the requested data is retrieved by the DBMS and returned to the requester. A query language almost universally supported by current DBMSs is the SQL language, a formal database industry standard (the latest ANSI standard of the language known informally as SQL/99). SQL is a non-procedural data sublanguage concerned specifically with database objects and operations, such as data definition, manipulation, and control. Despite attempts to make it a computationally complete language, SQL remains at present mostly a special-purpose language for the creation and manipulation of data in relational databases.

Used as a query language for data retrieval from relational databases, SQL provides access to data stored under most but not all DBMSs presently on the market. In some database systems, access to data is possible only by using proprietary query languages other than SQL. An example of such a system is the earlier mentioned SAP system. SAP's internal functions are performed using its own high level programming language, ABAP, a powerful and computationally complete fourth generation programming language with a tightly integrated data dictionary. By design, SAP provides only a carefully controlled ability to interface to modules written in languages other than ABAP, such as C++ language. Users may use ABAP (the latest version of which is ABAP4) to create their own specialized application functions and reports, for example to gain access to data stored in a SAP system. Interface tools are available in SAP to allow such application software to be interfaced to the SAP system. Of those, Remote Function Calls (RFC) service supported by the SAP system for both SAP to SAP and SAP to non-SAP communications is most frequently used. Even though the RFC service can be used to call a non-SAP function, such a call has certain limitations and disadvantages. In particular, when sending a data query to a SAP database from an external process via the RFC service, data cannot be returned to the external process at the same time as they are being retrieved from the SAP database, as any such attempt results in the loss of a database cursor, thus disrupting the data retrieval process. As a result, the external process has to wait until all the requested data is retrieved, before the data is returned to the process. Depending on the amount of data to be retrieved, this may cause substantial delays in completing the data query.

The proprietary nature of data storage and access makes data sharing difficult between different systems and applications. In the practice of business data management and analysis, however, such a need occurs frequently, for example, when the system under which data of interest is stored and maintained does not offer data management or analysis tools considered to be particularly advantageous to a data analysis task at hand, or when merging data from different systems is required. Using data stored under one system by another system or application capable of accomplishing a task at hand requires data retrieval from the first system and transferring the data to the second system or application prior to accomplishing the task. Such a data retrieval and transfer is particularly difficult if the first system does not support the query language in which data is requested by the second system or application. What is therefore needed is a system and method for a fast and efficient access to data stored in a database system supporting one query language, when data is requested by a system or application supporting another query language. The present invention provides such a system and method which are free of many prior art limitations.

SUMMARY OF THE INVENTION

In its broad aspect, the present invention provides a method and a system for fast and efficient retrieval of data from a database system accepting and processing data requests in one query language, when the data is requested in another query language by a process external to the database system. This is achieved by providing an interface module operatively coupled to the external process and the database system, which module upon receiving from the external process a data query in the first query language generates an equivalent data request in the second query language and sends the data request to the database system for processing and data retrieval. The interface module then receives the retrieved data from the database system and returns the data to the external process.

In a preferred embodiment, the interface module processes simultaneously multiple data queries and operates as four separate processes which communicate with one another to coordinate their actions. The first process is the highest level process responsible for receiving data queries in the first query language from the external process, generating corresponding data requests in the second query language supported by the database system, and returning the retrieved data to the external process. The first process also provides data processing functions supported by the first but not by the second query language. If such functions or operations are included in the data query received from the external process, the first process provides an appropriate processing of the data retrieved from the database system, prior to returning the data to the external process.

The data requests generated in the second query language by the first process are forwarded to a second, lower level process, which communicates these requests to the database system. If the amount of data retrieved does not exceed a predetermined amount, the second process receives the retrieved data from the database system and forwards it to the first process. If the amount of data exceeds the predetermined amount, data is compressed by the database system upon retrieval and written to files on the database system server. The compressed data is then retrieved from the files by a third process and sent to a fourth process for decompression. Data decompressed by the fourth process is then forwarded to the first process.

It is an important feature of the present invention that the four processes of the interface module, while communicating with one another to accomplish the overall goal, operate independently of one another and at least in part concurrently. For example, the fourth process may be decompressing data received from the third process and sending data to the first process, while the third process is receiving data from the database system and sending it to the fourth process. This concurrent operation is in part due to the fact that the flow of data between a data-forwarding and a data-accepting process of the interface module is taking place through a pair of alternating buffers, under control of read/write semaphores. As soon as one buffer is filled with data by the data-forwarding process, the buffer is read and its content processed by the data-accepting process, while at the same time the second buffer is being filled with data by the data-forwarding process. It is another important feature of the present invention that the retrieval of data from the database and the transfer of data from the database to the interface module is carried out concurrently by two separate processes. Combined with other features of the interface module, this results in a fast and efficient transfer of data from the database system to the external process.

Thus, according to one aspect of the invention, there is provided a method for retrieving data from a database system by an external process, said external process issuing data queries in a first query language, said database system accepting and processing data requests in a second query language, which method comprises the steps of: providing an interface module operatively coupled to the external process and the database system, said interface module generating an equivalent data request in the second query language when receiving a data query in the first query language; sending a data query in the first query language from the external process to the interface module; generating in the interface module at least one data request in the second query language, said data request being equivalent to the data query sent by the external process in the first query language; sending the generated data request from the interface module to the database system for processing and data retrieval; transferring the retrieved data from the database system to the interface module; and returning the retrieved data from the interface module to the external process, wherein the retrieval of data from the database system is carried out concurrently with the transfer of the retrieved data from the database system to the interface module.

According to another aspect, the invention provides a system for retrieving data from a database system by an external process, said system comprising: means for running the external process, said external process issuing data queries in a first query language; means for hosting the database system, said database system accepting and processing data requests in a second query language; means for running an interface module, said interface module operatively coupled to the external process and the database system, said module capable of: generating an equivalent data request in the second query language when receiving a data query in the first query language from the external process; sending the generated data request to the database system for processing and data retrieval; transferring the retrieved data from the database system; and returning the retrieved data to the external process, wherein the retrieval of data from the database system is carried out concurrently with the transfer of the retrieved data from the database system to the interface module.

Other advantages, objects and features of the present invention will be readily apparent to those skilled in the art from the following detailed description of preferred embodiments in conjunction with the accompanying drawings and claims.

BRIEF DESCRIPTION OF THE DRAWINGS

The embodiments of the invention will now be described with reference to the accompanying drawings, in which.

DETAILED DESCRIPTION OF THE PREFERRED EMBODIMENTS

In the absence of an explicit statement to the contrary, the term "database system" as used herein refers to one or more database systems, under control of a common or separate database management systems. The database system may be located on a single computer or may be distributed over several computers connected to a network. The term "external process" refers to a program or programs which are not part of the database system, which program or programs send at their runtime at least one data query for data stored in the database system and which program or programs may be run on a single computer or on several networked computers. The term "interface module" refers to a combination of hardware and software providing an interface between the external process and the database system, which interface ensures that data requested by the external process in a query language not supported by the database system are retrieved from the database system and returned to the external process. The term "process" refers to anyone of several co-operating programs run by the interface module, which programs retrieve from the database system and return data requested by the external process. In one preferred embodiment, the co-operating processes run by the interface module may be threads of a single program.

Figure 1:
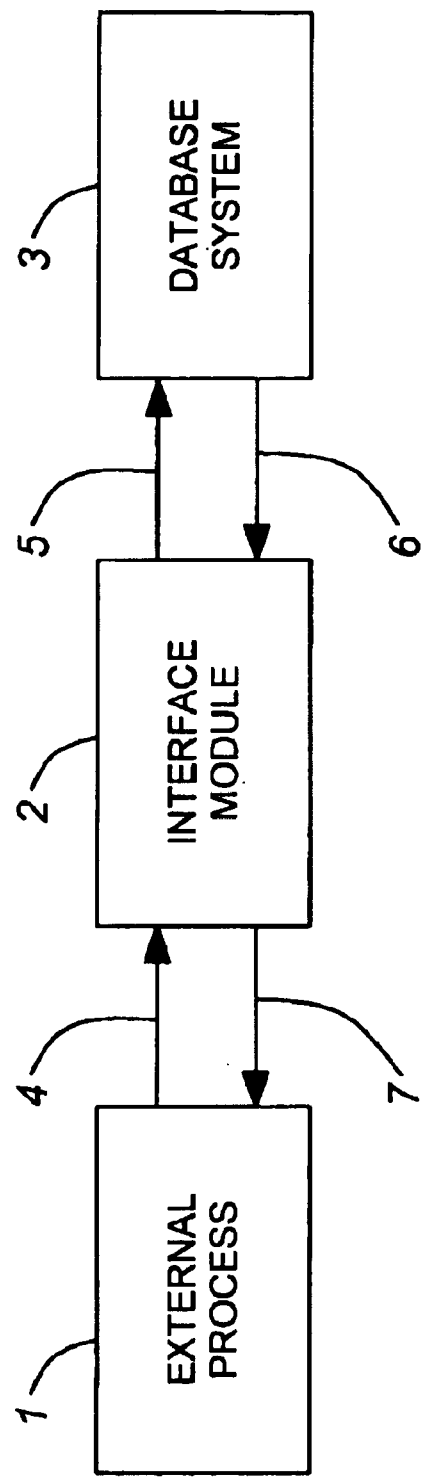
FIG. 1 is a block diagram illustrating a system for data retrieval according to the present invention.

Turning to the figures, FIG. 1 shows a block diagram illustrating essential elements of the data retrieval system according to the present invention. The system comprises an external process 1, which external process sends during its runtime a data query 4 to an interface module 2. The data query 4 is formulated in a first query language. Based on the data query 4 received from the external process 1, the interface module 2 generates and sends to a database system 3 an equivalent data request 5. The data request 5 is formulated in a second query language which is supported by the database system 3. The data request 5 is processed by the database system 3 and the retrieved data 6 is returned to the interface module 2. After an additional processing, if any, the data 6 received by the interface module 2 is returned as data 7 to the external process 1, which data 7 satisfies the requirements of the data query 4. According to a preferred embodiment of the invention, the first query language is the SQL language, the second query language is the ABAP language and the database system is a SAP database system.

The data request 5 generated by the interface module in the second query language is considered to be equivalent to the data query 4 issued in the first query language, if the data 7 returned to the external process 1 satisfies all the requirements of the data query 4. This may not always be true for the data 6 retrieved from the database system 3 and returned to the interface module 2 in response to the data request 5. Depending on the nature of the data query 4 the retrieved data 6 may be subjected to additional processing in the interface module 2, to provide the data 7 satisfying all the requirements of the original data query 4.

The data query 4 sent by the external process 1 may involve more than one data source from which data is to be retrieved. The data query 4 formulated in the first query language may involve functions and operations not supported by the second query language used for querying the database system 3. These operations and functions are in this case performed by the interface module 2 on data 6 retrieved from the database system 3, before returning the data 7 to the external process 1. Because the interface module 2 can compensate for functions and operations not available in the second query language, the user sending the data query 4 via the external process 1 needs not be concerned with the specific nature, querying capabilities, command syntax, etc. of the second query language supported by the database system, as those are solely determined by the first query language familiar to the user.

To complete a single data query 4 received from the external process 1, more than one data request 5 may be generated by the interface module 2 and forwarded to the database system 3. As a result, more than one set of data 6 may be received from the database system 3. The data sets so received are then processed by the interface module 2 before being returned as a single data set 7 to the external process 1. All this is transparent to the user who receives the data determined by the data query 4.

The interface module 2 may process simultaneously multiple data queries 4. This may be the case, for example, when the interface module 2 is coupled to more than one external process 1 and receives data queries from more than one external process 1 at the same or almost the same time. This is again of no concern to users sending data queries 4 from their respective external processes 1, as the simultaneous processing of multiple data queries is handled transparently by the interface module 2 and the users receive the requested data 7 in exactly the same way as if a single data query 4 was handled by the interface module 2. Depending on the load on the interface module 2 at any given time, simultaneous processing of multiple data queries 4 may be perceived by individual users as a reduced performance of data retrieval from the database system 3. This would be similar for two interface modules coupled to the same database system and being in operation at the same time.

When a substantial amount of data has to be retrieved for a data query 4, data may be compressed upon retrieval from the database system 3 and returned in the compressed form to the interface module 2, where it is decompressed (inflated), before being processed and returned to the external process 1. Both compressing and decompressing is carried out using a suitable compressing software, for example using ZLIB data compression/decompression algorithm.

Figure 2:
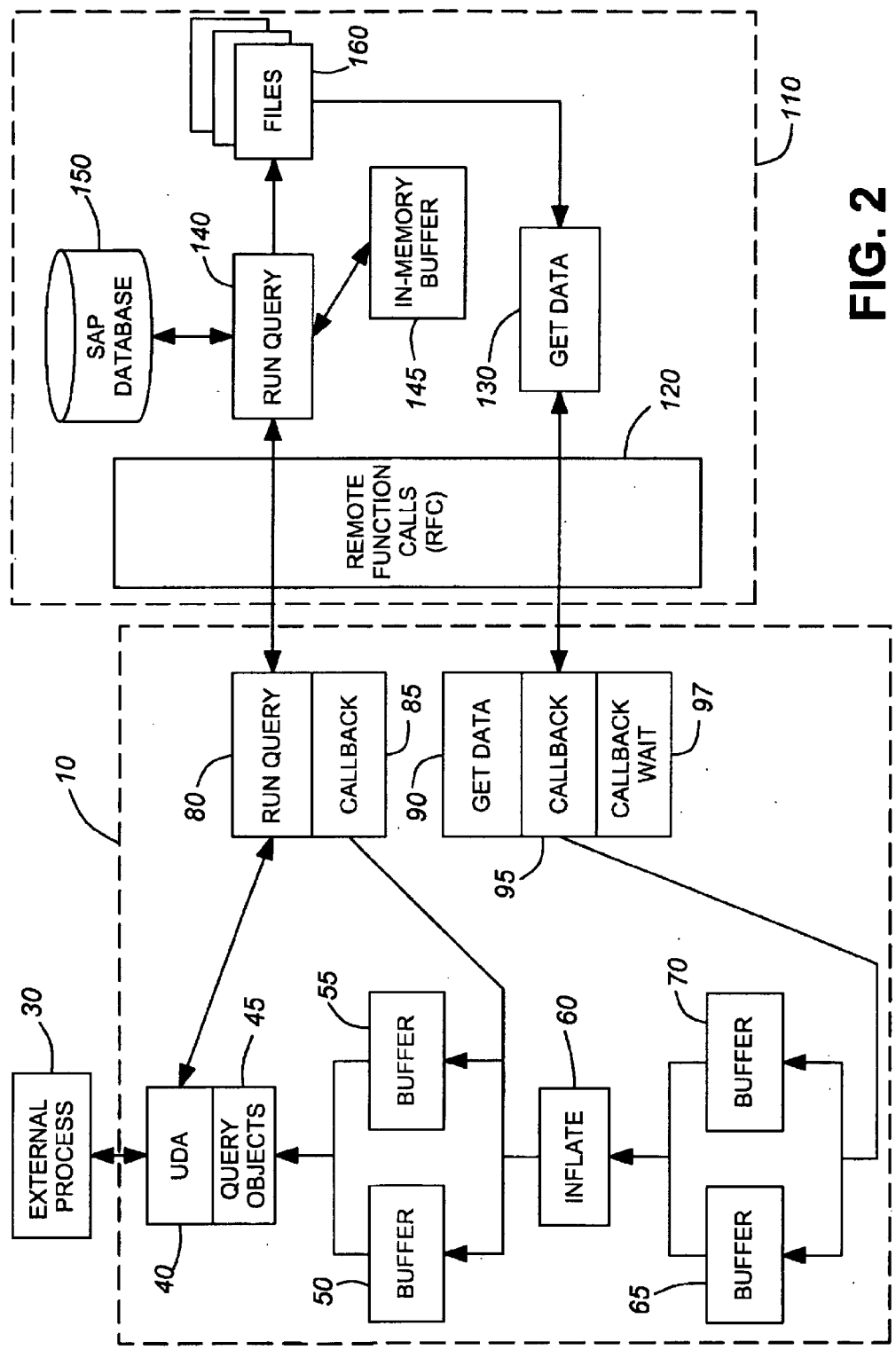
FIG. 2 is a block diagram illustrating a system for data retrieval according to a preferred embodiment of the present invention.

FIG. 2 shows a data retrieval system according to one preferred embodiment of the invention. According to this embodiment, the interface module 2 of FIG. 1 is a client program (client) 10 running on a computer (not shown), for example a personal computer, which client 10 receives data queries from an external process 30 running on the same or another computer (not shown). In the latter case, both computers are interfaced to and communicating through a network (not shown). The data queries received from the external process 30 are formulated in the SQL language (further referred to as SQL queries). SQL queries may be entered directly by the user, e.g., from a keyboard, or generated through a suitable user interface, e.g., a graphical user interface provided by the external process 30. There may be more than one external process 30 sending SQL queries to the client 10 at the same time.

The client 10 communicates with an SAP server 110 comprising an SAP database 150 queried by the external process 30 via the client 10. There may be more than one database 150, which may be located on the same computer (not shown) as the server 110 or distributed over several computers communicating through a network (not shown)

with the server computer. The client 10 communicates with the SAP server 110 via a Remote Function Calls (RFC) service 120 provided by the SAP server 110.

The client 10 operates as four co-operating processes spanning the client 10 and the server 110 computers. When awakened from a wait state, each process can work on its particular task independently of the remaining processes. Communication between the processes is achieved via shared memory Query Objects created by the highest level process upon receiving a data query from the external process 30. Two of the client 10 processes have sister components on both the client 10 and the server 110 computers. These sister components communicate between themselves via the RFC service 120.

The highest level process is a Universal Data Access (UDA) process 40, which is run entirely on the client computer. The UDA process 40 is called by the external process 30 when the latter sends a SQL query. When called, the UDA process 40 accepts the SQL query from the external process 30 and in cooperation with the lower level processes returns rows of data to the external process 30 which requested them. The SQL query sent by the external process 30 may involve more than one SAP data source (SAP database) 150 and may involve functions and operations not supported by the SAP server 110. Whenever possible, these functions and operations are "pushed down", to be performed by a lower level process. Otherwise, the UDA process 40 performs the functions and operations on the retrieved data. Because the UDA process 40 can compensate for functions and operations not supported by the SAP server 110, the user of the external process 30 does not need to be concerned with the specific nature of the queried SAP system and its interfaces, which remain hidden behind a standard SQL interface. In a preferred embodiment, the version of SQL language supported by the UDA process 40 is COGNOS SQL.

The UDA process 40 converts each single SQL query received from the external process 30 into one or more SAP data requests. In other words, to complete a single SQL query sent by the external process 30, more than one SAP data requests may be generated by the UDA process 40 and processed by the SAP server 110. For each SAP data request generated in connection with an SQL query, a Query Object 45 is selected or created by the UDA process 40 and three additional lower level processes (a RunQuery process 80, a GetData process 90, and an Inflate process 60) associated with this Query Object are initiated. These processes remain in a wait (sleep) state until their actions are needed. When a SAP data request is completed, the Query Object 45 and lower level processes associated therewith may be retained in a pool of available Query Objects and can be used for processing subsequent SAP data requests. More than one SAP data request may be serviced at the same time by the client 10 and many Query Objects 45, each with its own three lower level processes, may be in operation simultaneously. Each Query Object thus includes a Query Status, Query Parameters, data communication buffers (two for compressed data and two for uncompressed data), semaphores controlling access to the buffers, three lower level processes and two independent RFC communication objects (for RunQuery and GetData processes).

When the UDA process 40 wants to send a SAP data request after receiving a SQL query from the external process 30, it checks first the pool of available Query Objects for a Query Object 45 to be associated with the request. If a Query Object which is not currently active and which is connected to the appropriate database is found in the pool, this Query Object 45 is activated to process the data request. If no such Query Object is available, a new one is created and used to process the SAP data request. After the SAP data request has been processed, the Query Object 45 may be either deleted or returned to the pool. More than one Query Object 45 may be created or activated to process a single SQL query. This will depend on the number of SAP data requests generated by the UDA process 40 in connection with the received SQL query, with one Query Object for each SAP data request. Each such Query Object has its own set of buffers and the three lower level processes. The number of Object Queries in existence is limited to some predetermined number, depending mostly on the available system resources. The UDA process 40 may delete at any time all inactive Query Objects 45.

Each SAP data request generated by the UDA process 40 produces a single tabular result. In the simplest case, the SAP request is the name of an actual table or view defined in the SAP database 150. In a more involved situations, the SAP data request may consist of a series of ABAP statements which taken together produce the desired tabular result. Tables retrieved from the SAP database 150 may be further processed by the UDA process 40 to meet the requirements of the original SQL query. In particular, if multiple SAP data requests are issued, the multiple resulting tables are combined (joined) to produce a single resultant table which satisfies the original SQL query.

For each SAP data request generated by the UDA process 40, a client-based RunQuery process 80 is activated via the Query Object 45 associated with this request and the SAP data request is sent to this process from the UDA process 40. The client-based RunQuery process 80 then activates the client-based GetData process 90 and initiates its sister, server-based RunQuery process 140, by sending to this process the SAP data request via the RFC service 120. The server-based sister RunQuery process 140 accesses the SAP database 150 to retrieve the data defined in the received SAP data request and accumulates the data in an in-memory data buffer 145 of a predetermined storage capacity, for example 20 kB. If the buffer fills with data, the data is compressed using a commercial compression software, for example a software using the ZLIB compression algorithm, as it is written to files 160. The files 160, each having the same predetermined data storage capacity, are numbered and filled consecutively with the compressed data in the ascending numerical order. Alternatively, instead of having files of a specified size (storage capacity), files may be filled with a variable amount of data, by writing the data to consecutive files for a predetermined period of time, e.g., one second.

The server-based RunQuery process 140 does not communicate back to the client via the RFC service 120 while data are being retrieved from the database 150, because the SAP database cursor would be destroyed by any RFC communication between the sister RunQuery processes 80 and 140 taking place during the data retrieval. Any communication via the RFC service 120 between the client-based RunQuery process 80 and the sister, server-based RunQuery process 140 takes place either before the data retrieval from the database 150 is initiated or after the data retrieval is completed. In particular, if the data to be returned by the server 110 fits uncompressed in the inmemory buffer 145, this data is transmitted directly by the server-based RunQuery process 140 via the RFC service 120 to a CallBack function 85 in the client-based RunQuery process 80, after the data retrieval is completed. Actions taken by the CallBack function 85 upon receiving the data will be explained later. After all the requested data has been retrieved from the SAP database 150, the server-based RunQuery process 140 terminates its activity and returns control to the client-based RunQuery process 80. Once started, the RunQuery process 140 cannot be stopped directly, since this would require a communication through the RFC service 120 resulting in the database cursor being destroyed. If the user wishes to abandon a query before the RunQuery process 140 have retrieved all its data, this can be signalled to the RunQuery process by initiating a separate ABAP process which writes a file of a specified name with a message to the RunQuery process to terminate its activity. In anticipation of such an event, the RunQuery process looks periodically for such a file and message.

The client-based GetData process 90 is activated each time a Query Object 45 is selected or created by the UDA process 40. When activated, the client-based GetData 90 process starts a sleep timer, to sleep for an additional predetermined short period of time, for example one second. This delay gives the server-based RunQuery process 140 time to accumulate the requested data in the files 160, or, if the retrieved data fits uncompressed in the in-memory buffer 145, to accumulate and return all the data to the client 10. If the client-based RunQuery process 80 is terminated sooner than the predetermined short period of sleep time, the client-based GetData process 90 is re-awakened (re-activated) at this point. When awakened, the client-based GetData process 90 determines if the client-based RunQuery process 80 is completed and, if this is the case, determines if the requested data has been returned directly to the client 10 or compressed and written to the files 160. If the data has been returned directly to the client-based RunQuery process 80, the client-based GetData process 90 is not required to complete the data request and the client-based GetData process 90 goes into a wait state, until activated by a next SAP data request generated by the UDA process 40. If the server-based RunQuery process 140 has not been completed or has been completed but has written data to the files 160 on the server 110, the client-based GetData process 90 initiates its sister, server-based GetData process 130. The server-based GetData process 130 then moves to the client 10 data from the files 160 created and filled with compressed data by the server-based RunQuery process 140.

When initiated, the server-based GetData process 130 determines if there is any data available in the files 160. If this is the case, the server-based GetData process 130 accesses the data and sends it back via the RFC service 120 to a CallBack function 95 in the client-based GetData process 90. The files 160 are accessed in the ascending numerical order. After a file is emptied, it is immediately removed from the server 110.

If no files 160 are found by the server-based GetData process 130, it may be because there was no data to be written to the files or the server-based RunQuery process 140 needs more time to produce the data. If files 160 are found and all data available in the files has been transmitted, it may be that the server-based RunQuery process 140 needs time to produce more data. Whenever the server-based GetData process 130 determines that there is no data for transmission, it calls via the RFC utility 120 a CallbackWait function 97 in the client-based GetData process 90. The CallbackWait function 97 returns a status code indicating the current status of the server-based RunQuery process 140. If the returned code indicates that the server-based RunQuery process 140 is still in operation, the server-based GetData process 130 repeats the processing of any available data or, if none is available, calls again the CallbackWait function 97. This cycle is repeated until the status code returned by the CallbackWait function 97 indicates that the server-based RunQuery process 140 is completed. At this point the server-based GetData process 130 processes any remaining data and returns control to the client-based GetData process 90.

It would be obvious to those skilled in the art that the server-based RunQuery and GetData processes 140 and 130, respectively, could communicate directly with each other through some mechanism, such as a shared file. In the preferred embodiment, however, they share data through the files 160 and other information, such as status, using the callback mechanism. This is a one-way communication, from the RunQuery process 140 to the GetData process 130. Using the GetData process for moving the data between the server 110 and the client 10 provides the advantage of the data being moved to the client 10 at the same time as more data is being retrieved from the database 150 by the server-based RunQuery process 140. As the GetData processes 90 and 130 do not run any data queries on the database 150, they can communicate through the RFC utility 120 at any time without adversely affecting the data retrieval from the database, because for this process there is no database cursor to be destroyed. As the server-based GetData process 130 is seen by the SAP system as independent from any other processes run by the system, its RFC communications does not adversely affect any other process run by the system at the same time, in particular the server-based RunQuery process 140, which may query the database 150 at the time when a RFC communication between the GetData processes 90 and 130 takes place.

The Callback functions 85 and 95 used by the client-based processes RunQuery 80 and GetData 90, respectively, are both responsible for returning the retrieved data to the UDA process 40, and their actions depend on the nature of the data received. If the retrieved data is not compressed, it is returned by the server-based RunQuery process 140 to the Callback function 85 in the client-based RunQuery process 80, and moved by the Callback function 85 to alternating inflated buffers 50 and 55. If the retrieved data is compressed, it is returned by the server-based GetData process 130 to the Callback function 95 in the client based GetData process 90. The Callback function 95 activates in this case the Inflate process 60 and moves data to alternating compressed data buffers 65 and 70. After moving the data to appropriate buffers, the control is in either case returned by the Callback function to the server-based GetData process 130 or to RunQuery process 80. In a preferred embodiment, a single Callback function is shared by the RunQuery process 80 and the GetData process 90, which Callback function performs actions depending on from which process it was called, as explained above. Data moved from the server 110 to the Callback function by either of the two server-based processes 130 and 140 is accumulated in a function's buffer. Testing has indicated that the time necessary to transmit a data buffer through the RFC service 120 is dependent on the declared size of the buffer rather than on the amount of data in the buffer. As the size of the buffer of the Callback function is fixed at compile time, several Callback functions may be provided. They differ only by the declared maximum size of the buffer they can accept and the function to be called at runtime is determined by the amount of data to be transmitted.

There is no simple way for two ABAP processes, such as the server-based RunQuery 140 and GetData 130 processes to communicate with each other, except through files. In most cases when the server-based GetData process 130 has no data to transmit, the best course of action is to wait until more data is available. Again, there is no convenient way for an ABAP process to sleep. The CallbackWait function 97 solves both above problems, by checking the status of the server-based RunQuery process 140 and providing means for the server-based GetData process 130 to wait for additional data. When called, the CallbackWait function 97 determines whether the server-based RunQuery process 140 has been completed. If so, the CallbackWait function 97 signals this fact to the server-based GetData process 130 which completes processing any remaining available data and exits back to the client-based GetData process 90. If the server-based RunQuery process 140 has not been completed, the CallbackWait function 97 sets a timer to sleep for a predetermined short period of time before checking again the state of the process and returning processing control to the server-based GetData process 130.

Data moved by the Callback function 95 (85) to the alternating compressed data buffers 65 and 70 are processed by the Inflate process 60. This process reads data from the buffers, inflates (decompresses) the data using the same compression/decompression algorithm as used for data compression on the server 110, and writes the decompressed data to the alternating inflated data buffers 50 and 55. Data from these buffers are then accessed by the UDA process 40.

SAP systems are known to recognize and run two classes of processes: foreground and background processes. In a SAP system, a foreground process is usually intended for a human interacting with the system in real time, without putting much strain on the system's resources, whereas a background process is usually intended for tasks which put a considerable strain on the system or take a considerable time to accomplish. A foreground process is given a high priority on the use of system's resources, but strict limits are imposed on the time the process is allowed to use them. If this time limit is exceeded by the foreground process, the process is simply terminated by the system, whether or not the task it was supposed to accomplish was completed. This means that if the server-based RunQuery process 140 is initiated as a foreground process for a larger scale data retrieval, it may exceed the time limit imposed by the system and may be terminated before all the required data can be extracted. On the other hand, launching the server-based RunQuery process 140 as a background process results in the process being unable to communicate with the initiating client program 10. According to a preferred embodiment, this problem may be overcome by initiating the server-based RunQuery process 140 as a "short lived" foreground process which, in turn, creates on the SAP server 110 a background RunQuery process. The latter never communicates back to the client 10, but simply retrieves data from the database 150 and writes this data to files 160, in the same manner as the foreground RunQuery process 140 would do within the time limits imposed by the system. However, there are no such time limits for the background RunQuery process, so the data retrieval from the SAP database 150 may proceed uninterrupted to the completion.

On the other hand, the server-based GetData process 130 must communicate in real time and without delay the data retrieved by the background RunQuery process to the client 10 and therefore must be run as a foreground process. Although the data transfer accomplished by the server-based GetData process 130 is usually much less time-consuming than the data retrieval accomplished by the RunQuery process, for a larger scale data retrievals the GetData process 130 could still exceed the limits imposed on a foreground process. To avoid the GetData process 130 being interrupted by the system and a part of the retrieved data being lost, this process is run as a series of foreground GetData processes, each of which does not exceed the foreground processing limits. This is achieved by the server-based GetData process 130 checking its own duration time after transmission of a single file 160. If this time exceeds a preset limit, for example 50% of the system time limit for a foreground process, the GetData process 130 voluntarily terminates itself, which termination is recognized by the client 10 based on the preset time limit. The client 10 then initiates a new foreground server-based GetData process 130 to continue the data retrieval from the next file 160 and this cycle is continued until the retrieval of the requested data from the database 150 is completed.

Even though the background RunQuery process cannot signal directly the termination of data retrieval to client 10, it can record this termination in a signal file (not shown) on the SAP server 110. The server-based GetData process 130 checks periodically the signal file for this information and informs the client 10 that the background RunQuery process has terminated the data retrieval when the termination information is found in the signal file.

The method and system of data retrieval according to the present invention provides the benefit of several operations being performed concurrently by multiple co-operating processes, thus shortening the total time necessary for performing the retrieval. In many cases, a process reads data from one place and writes it to another. If only one buffer was used for each read/write operation, the processes would be considerably slowed down waiting for a full buffer to be emptied or an empty buffer to be filled. To avoid such bottlenecks, two sets of alternating buffers are used according to the preferred embodiment of the invention, the alternating compressed data buffers 65 and 70 and the alternating inflated data buffers 50 and 55.

Associated with each pair of alternating buffers is a pair of semaphores: a read semaphore and a write semaphore. When both buffers are empty, the write semaphore is set to 2, indicating that there are two buffers available for writing, and the read semaphore is set to 0, indicating that there are no full buffers. A process which wants to write into such a pair of buffers decrements the write semaphore by 1, claims the first buffer and starts writing. When the first buffer is filled, the read semaphore is set to 1 (indicating that there is one buffer available for reading), the writing process switches to the second buffer and decrements the write semaphore from 1 to 0, indicating that there are no more buffers available for writing. A process which wanted to read data from this pair of alternating buffers was originally blocked on the read semaphore, waiting for data to process. As soon as the read semaphore is incremented from 0 to 1, this process starts processing, decrementing the read semaphore to 0 and reading from the buffer. When the process has finished processing the data, the buffer is again ready to accept more data, so the write semaphore is incremented to 1. The two processes continue to check, increment and decrement the semaphores, switching back and forth between the buffers. Much of the time, one process is reading from one buffer while the other is filling the other buffer. Sometimes one process or the other may be waiting for a buffer to be filled or emptied, but at no time will both processes be blocked when using a set of alternating buffers. According to a preferred embodiment, there are two buffers in an alternating buffer set. It would be obvious to those skilled in the art that any arbitrary number of alternating buffer could be included in the set, for additional possible gains in the data processing speed.

As mentioned above, the SAP server-based RunQuery process 140 accepts and processes SAP data requests generated in ABAP code by the UDA process 40 and delivered to the server 110 via the client-based RunQuery process 80. These data requests can be handled by the server-based RunQuery process 140 in two alternative manners. One is a static, prewritten function which is able to retrieve data from any single SAP table or view by using the ABAP construct SELECT*FROM(table). Another one is a function which is able to generate and run a dynamic ABAP program incorporating pieces of ABAP code generated by the UDA process 40. This dynamically created ABAP program is usually more efficient in situations when a large amount of data is to be retrieved, especially when joining two or more tables. However, any SQL query can be satisfied by either the static or dynamically created ABAP program. The user may also choose to disable the dynamic generation of the ABAP program.

In almost every data query, such as an SQL query received from the external process 30, selection of data to be retrieved from among those available in the database is made. For example, most data requests generated by the UDA process 40 in response to an SQL query issued by the external process 30 need only a subset of the data fields in each database row. This selection of predetermined data fields from all fields of a record stored in a relational database is known as projection. The static ABAP function of the server-based RunQuery process 140 can only retrieve complete records from the SAP database 150. Once a complete record is retrieved, only its needed portion is extracted by the server-based RunQuery process 140 and kept in the inmemory buffer 145 or compressed and written to the files 160. In the dynamically generated ABAP program alternative, an explicit projection list consisting of the required data fields is generated. In this case, only the required fields of records are extracted from the underlying database and moved to the client 10.

Similarly, most SAP data requests generated by the UDA process 40 in response to an SQL query issued by the external process 30 need only a subset of rows of a database table. This selection of predetermined rows of data from a table of a relational database is sometimes referred to as filtering. In the static ABAP function alternative of the server-based RunQuery process 140, the UDA process 40 generates a filter specification which is then used in the dynamic WHERE clause of the ABAP SELECT statement to extract only the desired rows. In the dynamically generated ABAP program alternative, the UDA-generated filter specification is incorporated directly in the dynamically created ABAP code.

Finally, some data SQL queries issued by the external process 30 require a combination of data taken from several tables stored in the SAP database 150. The operation of combining data from multiple tables of a relational database is known as a join. In the method and system of the present invention, only a single table of the SAP database 150 is accessed at any given time. If a join is involved in the SQL query issued by the external process 30, necessary data from all the tables implicated in the join are retrieved one table at a time and the joining is performed either on the SAP server 110 when the ABAP code for data retrieval is dynamically generated, or by the UDA process 40 when data is retrieved by the static ABAP function.

The method of data retrieval according to the present invention is particularly advantageous in a system having a distributed client-server architecture, with the external process, the client, the queried database and the server running on different computers communicating through a network. In such an environment, the communication between computers may substantially contribute to the overall time necessary to satisfy a data query. Compressing the data to be communicated between computers, at the fairly insignificant cost of additional CPU power on each computer to accomplish the compression and decompression of data, may reduce considerably the amount of time required for a data query processing.

Similarly, in a system with a distributed architecture, multiple CPUs are involved in processing a data query. Using several independent processes to carry out the query allows to break down the data retrieval into tasks which may be run concurrently by different CPUs, which is equivalent to CPUs operating in parallel, with speeding up the data retrieval as a net result. Even when the whole system is run on a single computer, using multiple independent processes allows the CPU to be used more effectively, since while the computer is waiting for a next batch of data to be fetched, its CPU can be used for other tasks, like decompressing or further refining the data already communicated.

While the present invention has been described in connection with what is presently considered to be the most practical and preferred embodiments, it is to be understood that the invention is not limited to the disclosed embodiments. To the contrary, the present invention is intended to cover various modifications and equivalent arrangements included within the spirit and the scope of the appended claims. The scope of the appended claims is to be accorded the broadest interpretation so as to encompass all such modifications and equivalent structures and functions.

What is claimed is:

1. A method for retrieving data from a database system by an external process, said external process issuing data queries in a first query language, said database system accepting and processing data requests in a second query language, which method comprises the steps of:
   a. providing an interface module operatively coupled to the external process and the database system, said interface module generating an equivalent data request in the second query language when receiving a data query in the first query language;
   b. sending a data query in the first query language from the external process to the interface module;
   c. generating in the interface module at least one data request in the second query language, said data request being equivalent to the data query sent by the external process;
   d. sending the generated data request from the interface module to the database system for processing and data retrieval;
   e. transferring the retrieved data from the database system to the interface module; and
   f. returning the transferred data from the interface module to the external process, wherein the retrieval of data from the database system is carried out concurrently with the transfer of the retrieved data from the database system to the interface module.

2. A method according to claim 1, further including the steps of compressing the data retrieved from the database system before transferring the retrieved data to the interface module and decompressing the transferred data in the interface module.

3. A method according to claim 2, further including the step of processing the data transferred to the interface module from the database system before returning the transferred data to the external process.

4. A method according to claim 3, wherein the data processing includes operations selected from the group consisting of filtering, projecting and joining.

5. A method according to claim 3, wherein the steps of the method are carried out by a plurality of independent co-operating processes.

6. A method according to claim 5, wherein the data retrieval, transfer, decompression and processing are carried out by separate processes.

7. A method according to claim 6, wherein the data retrieval is carried out by a SAP background process.

8. A method according to claim 7, wherein the data transfer is carried out by a SAP foreground process.

9. A method according to claim 5, wherein the processes run at least in part concurrently.

10. A method according to claim 9, wherein data is moved between the processes through alternating buffers under control of read/write semaphores.

11. A method according to claim 9, wherein the database system is an SAP database system and the second query language is the ABAP language.

12. A method according to claim 1, wherein the interface module accepts and processes simultaneously multiple data queries.

13. A method according to claim 1, wherein the first query language is the SQL language.

14. A system for retrieving data from a database system by an external process, said system comprising:
  a. means for running the external process, said external process issuing data queries in a first query language;
  b. means for hosting the database system, said database system accepting and processing data requests in a second query language;
  c. means for running an interface module, said interface module operatively coupled to the external process and the database system, said interface module capable of:
   i. generating an equivalent data request in the second query language when receiving from the external process a data query in the first query language;
   ii. sending the generated data request to the database system for processing and data retrieval;
   iii. transferring the retrieved data from the database system to the interface module; and
   iv. returning the retrieved data to the external process, wherein the retrieval of data from the database system is carried out concurrently with the transfer of the retrieved data from the database system to the interface module.

15. A system according to claim 14, wherein the data retrieved from the database are compressed before transferring to the interface module and decompressed in the interface module.

16. A system according to claim 15, wherein the data transferred to the interface module are processed before returning to the external process.

17. A system according to claim 16, wherein the data processing includes operations selected from the group consisting of filtering, projecting and joining.

18. A system according to claim 16, wherein the interface module operates as a plurality of independent co-operating processes.

19. A system according to claim 18, wherein the data retrieval, transfer, decompression and processing are carried out by separate processes.

20. A system according to claim 19, wherein the data retrieval is carried out by a SAP background process.

21. A system according to claim 18, wherein the processes run at least in part concurrently.

22. A system according to claim 21, wherein data is moved between the processes through alternating buffers under control of read/write semaphores.

23. A system according to claim 14, wherein the interface module accepts and processes simultaneously multiple data queries.

24. A system according to claim 14, wherein the first query language is the SQL language.

25. A system according to claim 24, wherein the database system is a SAP system and wherein the second query language is the ABAP language.

26. A system according to claim 25, wherein the data transfer is carried our by a SAP foreground process.

* * * * *

UNITED STATES PATENT AND TRADEMARK OFFICE
CERTIFICATE OF CORRECTION

PATENT NO. : 6,741,982 B2
DATED : May 25, 2004
INVENTOR(S) : Rick Soderstrom and Michael Yarashevich It is certified that error appears in the above-identified patent and that said Letters Patent is hereby corrected as shown below:

Title page,
Item [57], ABSTRACT, "system to the module and returns the 4data to the external" should read -- system to the module and returns the data to the external --

Signed and Sealed this

Twenty-fifth Day of January, 2005

JON W. DUDAS
*Director of the United States Patent and Trademark Office*